United States Patent [19]

Tägström et al.

[11] Patent Number: 5,827,017
[45] Date of Patent: Oct. 27, 1998

[54] CHIPFORMING METAL CUTTING INSERT WITH RIDGES FOR SQUEEZING A CHIP

[75] Inventors: Pär Tägström; Jan Lundström, both of Sandviken, Sweden

[73] Assignee: Sandvik Aktiebolag, Sandviken, Sweden

[21] Appl. No.: 755,743

[22] Filed: Nov. 22, 1996

[30]     Foreign Application Priority Data

Nov. 23, 1995  [SE]  Sweden .................................. 9504174

[51] Int. Cl.$^6$ .................................................. B23B 27/22
[52] U.S. Cl. .......................................... 407/116; 407/114
[58] Field of Search .................... 407/117, 116, 407/115, 114, 113

[56]                References Cited

U.S. PATENT DOCUMENTS

| | | |
|---|---|---|
| 4,778,311 | 10/1988 | Niemi . |
| 4,801,224 | 1/1989 | Pettersson et al. . |
| 4,832,541 | 5/1989 | Noguchi et al. ..................... 407/117 X |
| 4,992,008 | 2/1991 | Pano . |
| 5,135,336 | 8/1992 | Noguchi et al. . |
| 5,375,948 | 12/1994 | Lindstedt ................................ 407/116 |
| 5,411,354 | 5/1995 | Gustafsson ........................... 407/117 X |
| 5,423,639 | 6/1995 | Wiman . |
| 5,704,737 | 1/1998 | Alford .................................. 407/117 X |

FOREIGN PATENT DOCUMENTS

| | | |
|---|---|---|
| 0 416 854 A1 | 3/1991 | European Pat. Off. . |
| 0106204 | 4/1990 | Japan ..................... 407/117 |

Primary Examiner—A. L. Pitts
Assistant Examiner—Henry W. H. Tsai
Attorney, Agent, or Firm—Burns, Doane, Swecker & Mathis, L.L.P.

[57]                ABSTRACT

A metal cutting insert, especially for grooving operations includes a front cutting edge and two side cutting edges disposed on a top side of the insert. Two laterally spaced, upstanding ridges are disposed on the top side, each ridge extending generally longitudinally. A chipbreaker pit is formed in the top side between the two ridges. A front portion of the pit is deeper than a rear portion of the pit and intersects the front cutting edge to form a depression therein. The pit guides a chip longitudinally rearwardly toward an edge formed by the intersection of the front and rear pit sections. The ridges converge rearwardly in the vicinity of the intersection edge to form therewith a squeezing zone which squeezes the chip. A pair of burls are upstanding on the pit front portion in the vicinity of respective ones of the ridges.

10 Claims, 2 Drawing Sheets

CHIPFORMING METAL CUTTING INSERT WITH RIDGES FOR SQUEEZING A CHIP

BACKGROUND OF THE INVENTION

The present invention relates to a cutting insert for grooving operations in metallic workpieces. In particular, the insert according to the invention is suited for facegrooving, although it may also be used for different grooving operations, and also for axial and radial longitudinally turning.

For such machining, the chip breaking and the chip shape are usually of decisive importance for an undisturbed production. Modern, high-productive machines have very high requirements on a good chip conveyance. Long, uncontrollable chips may easily cause breakdowns and cassations. Therefore, a high degree of attention must be paid to chip control and to a large extent this dictates the design of the tools.

Cutting inserts for grooving operations and cutting-off are usually clamped in a holder of the blade type so that it may be accommodated in the machined groove. The term "holder of the blade type" is intended to also comprise slotting cutters. Such inserts are for instance known from U.S. Pat. No. 4,778,311; 4,992,008; 5,135,336; and 5,423,639. In order to make possible facegrooving, by which circle-shaped grooves are formed, it is known to use a curved blade holder, in order to enable its insertion into the circle-shaped groove, see for instance EP-A-416 854. If one then wants to widen the groove to a width that exceeds the width of the insert, the grooving operation has to be repeated with a smaller or a larger groove diameter than that of the first-turned groove. When doing this, the widths of the second, third (and up to the $n^{th}$ groove) have to overlap somewhat with the width of the previous groove, since no material may be left between two consecutive groovings. This means that the cutting edge is not fully utilized, but only a certain part of it comes into operative engagement with the workpiece.

It has turned out that hitherto known cutting inserts for facegrooving function satisfactorily only when the whole cutting edge is working. If, e.g., half the cutting edge, or only a fourth of it, is working, the chips are not broken sufficiently and the chip control becomes inferior, whereby chip jamming and, in a worse case, a chip breakdown arises. In particular, for cutting widths which correspond to less than a fourth of the length of the cutting edge, there is no insert that offers a good chip control for facegrooving.

Thus, a first object of the present invention is to provide a cutting insert that is well suited for repeated, overlapping facegrooving.

Another object of the present invention is to provide an insert that functions well also when only a part of the cutting edge is in engagement.

Still another object of the present invention is to provide an insert that may also be used for longitudinal turning, in particular external turning on the bottom surface of a widened groove.

Yet another object of the present invention is to provide an insert that in a reliable way manages to make the first groove, at which normally a long, unbroken chip is formed.

SUMMARY OF THE INVENTION

These and further objects have been attained by a cutting insert for the chipforming cutting of metallic workpieces, such as a grooving operation, the insert comprises a rear shaft part and a cutting head situated at a front longitudinal end of the rear shaft part. The cutting head comprises a top side, a bottom side, and front and lateral relief surfaces. The front relief surface extends between the top and bottom sides and forms a main cutting edge at its intersection with the top side. The lateral relief surfaces extend between the top and bottom sides, and each lateral relief surface forms a side cutting edge at its intersection with the top side. Two laterally spaced, upstanding ridges are disposed on the top side. Each ridge extends generally in a longitudinal direction. A chipbreaker pit is formed in the top side between the two ridges. The pit comprises front and rear intersecting portions defining an intersection edge therebetween. The pit front portion intersects the main cutting edge to form a depression therein, whereby the pit defines a guide for a rearwardly travelling chip. Upper portions of the ridges disposed in the vicinity of the intersection edge are rearwardly convergent and form, together with the intersection edge, a squeezing zone for squeezing a rearwardly travelling chip. The pit front portion includes two laterally spaced burls situated in the proximity of respective ones of the ridges.

BRIEF DESCRIPTION OF THE DRAWING

For illustrative but non limiting purposes, a preferred embodiment of the invention will now be further described with reference to the appended drawings. These are herewith briefly presented.

DETAILED DESCRIPTION OF A PREFERRED EMBODIMENT OF THE INVENTION

Figure 1:
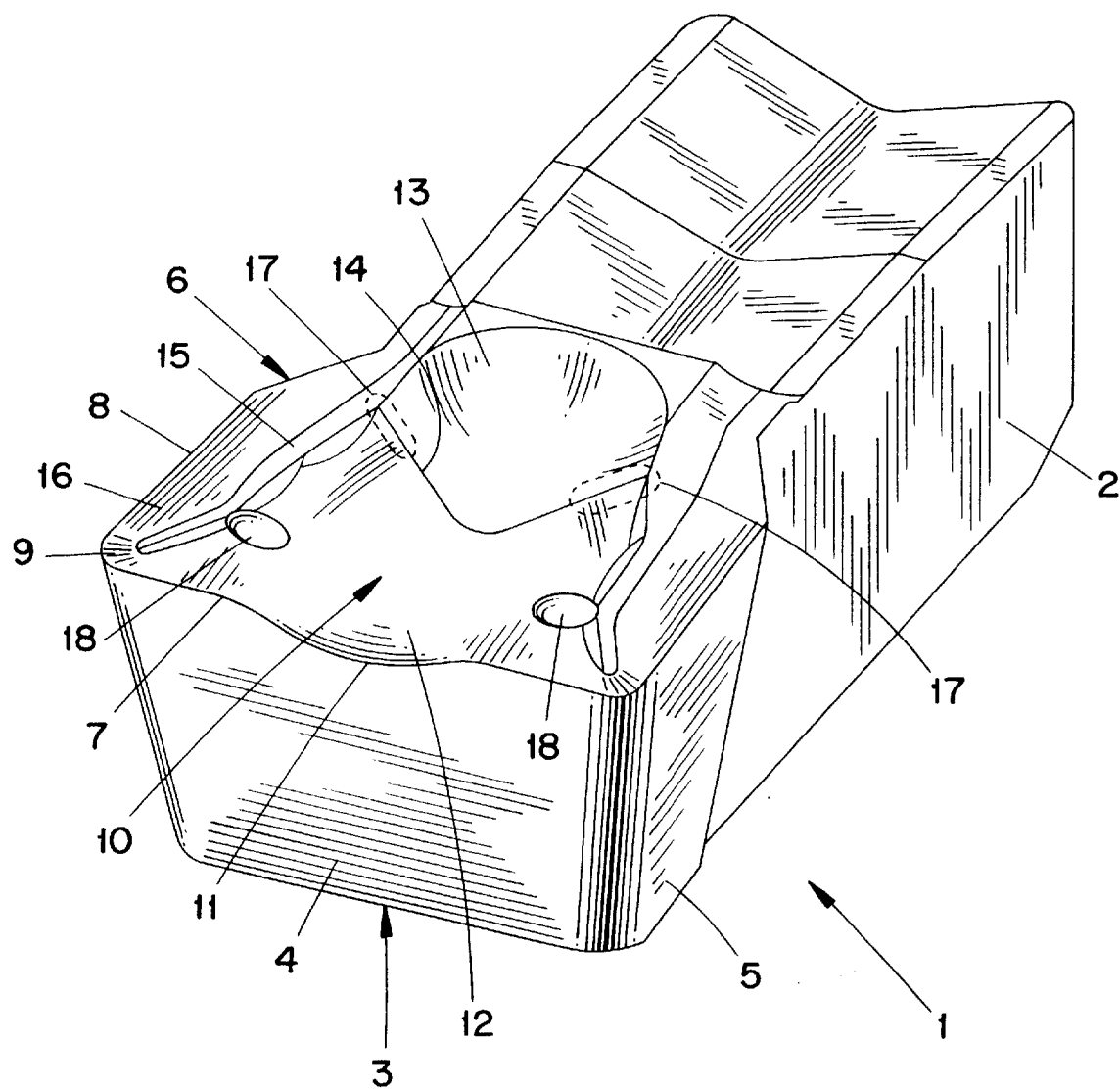
FIG. 1 shows a cutting insert according to the invention in a perspective view, obliquely from above.
Figure 2:
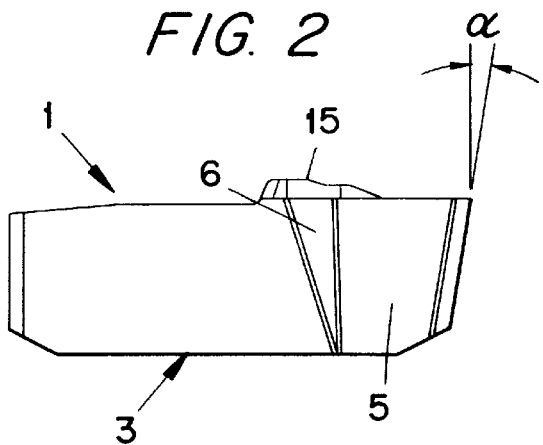
FIG. 2 shows a cutting insert according to the invention in a side view.

In FIG. 1, the cutting insert according to the invention is generally designated by reference numeral 1. It is made of a suitable hard material, such as cemented carbide. The geometry according to the invention has turned out to give a particularly long life, with maintained good chip control, when the cemented carbide contains 5 to 9% by weight of cobalt, preferably 5 to 8% by weight, a sum of TiC+TaC+NbC of between 0 and 10% b.w., and the rest WC, including naturally occurring impurities. Further, it may be advantageous that a small amount of the cubic tungsten carbide is replaced by carbonitride (0.1–0.3% b.w. of nitrogen in the sintered cemented carbide). The grain size of the tungsten carbide is suitably between 1.8 and 3.2 μm. Furthermore, the cemented carbide is suitably coated by PVD or CVD ("Physical Vapor Deposition" or "Chemical Vapor Deposition"), until a coating thickness of between 3 and 15 μm is obtained.

Figure 5:
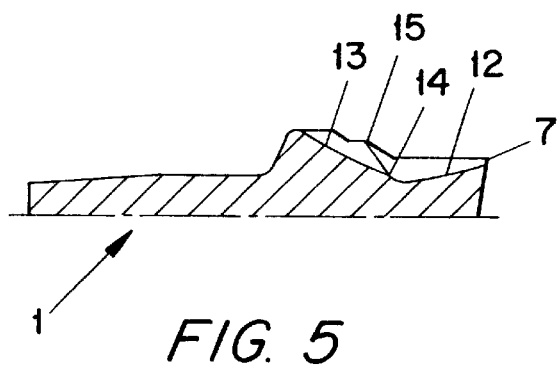
FIG. 5 shows a cross-section taken along line 5—5 in FIG. 4.
Figure 6:
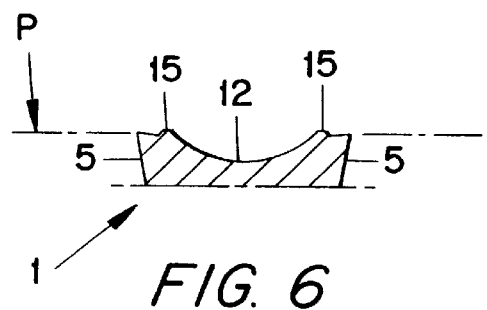
FIG. 6 shows a cross-section taken along the line 6—6 in FIG. 4.

The cutting insert comprises a shaft part 2 for being clamped in a suitable holder of the blade type, such as the one disclosed in U.S. Pat. No. 4,801,224. The operative cutting head of the insert comprises a top side, a bottom side 3 which is common for the whole insert, a front relief side 4, two lateral relief sides 5 and two rear relief sides 6. In order to give an adequate clearance, these relief sides are angled with respect to the vertical, so that they form an acute angle β with the top side and an obtuse angle δ with the bottom side (see FIG. 5). The relief angle α of the front side 4 may be about 3 and 15°.

Cutting edges are formed by the intersections between the relief sides and the top side, namely a front main cutting edge 7, two side cutting edges 8, and two corner cutting edges 9 situated at the rounded transitions between sides 4 and 5. Centrally on the top side of the cutting head there is formed a chipforming or chipbreaking pit, recess or cavity 10, which intersects the main cutting edge 7, so that the latter, in its middle portion, defines a curved, depressed cutting edge portion 11. The pit 10, which serves as a guide for a rearwardly traveling chip, is divided into a front portion 12, and a rear pit portion 13 superposed behind the front portion.

Figure 3:
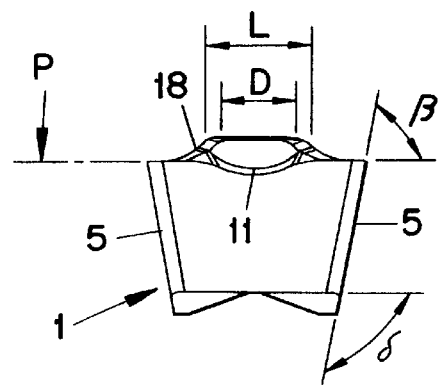
FIG. 3 shows a front view of the cutting insert of FIG. 2.
Figure 4:
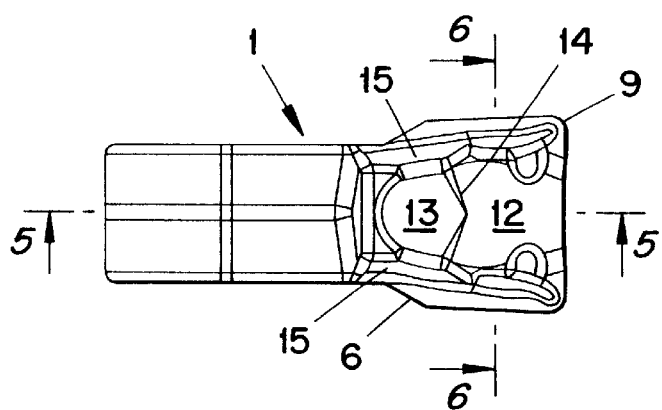
FIG. 4 shows the same cutting insert as FIG. 2, in top plan.

The bottom of the portion 13 extends to a higher point than does the bottom of the front pit portion 12. The transition between these two pit portions consists either of an intersection edge or break line 14 or a corresponding radius transition. The intersection edge 14 is formed as a substantially isosceles tip that points towards the main cutting edge. Along the opposite sides of the pit in the longitudinal direction of the cutting insert are provided two ridges 15, which are in the form of two fingers upstanding from the shaft part 2. Front ends of the ridges flare outwardly toward the two corner cutting edges 9, but do not extend all the way to said corner cutting edges. Between each ridge 15 and an adjacent cutting edge 8 there extends a primary land 16, which preferably is somewhat positive, for instance between +3 and +15°. Further, said ridges 15 are preferably located at the same height as, or somewhat higher than, the plane P defined by the two side cutting edges 8. In the regions around the contact point between the intersection edge 14 and each ridge 15, and slightly along said intersection line, there is a squeezing, clamping, bending and/or pressing zone, i.e., a "squeezing portion" or "squeezing point" 17. Those squeezing portions 17 converge rearwardly (i.e., in a direction away from the edge 7), which contributes to the squeezing and curving of the chip in its longitudinally direction, particularly during the first grooving operation, when the whole cutting edge is in engagement. Thereby, the distance D between the two squeezing portions 17 is preferably shorter than the length L of the curved, depressed cutting edge 11 (see FIG. 3). By "the length of the cutting edge 11" is meant the length of the horizontal projection between the two inversion points of the curves at either side of said cutting edge portion. Thus, to reiterate, a minimum lateral dimension D of the squeezing zone is less than a maximum lateral dimension L of the depression 11.

Adjacent to, or in the immediate proximity of either inwardly facing side of the ridges, between the intersection edge 14 and main cutting edge 7, there is arranged a bump or burl 18, which suitably is at a height corresponding to, or somewhat below, the plane P defined by the side cutting edges 8 and the two straight side portions of the main cutting edge.

The combination of a partially depressed cutting edge 11, burls 18 and two squeezing points 17 has resulted in a versatile and polyvalent cutting insert. When grooving, particularly when facegrooving, the combination of the depressed edge, the burls and the squeezing points contributes to a good chip control, even when less than the whole main cutting edge is in cutting engagement. Even turning widths of <¼ (i.e., less than one-quarter) of the width of the cutting insert gives surprisingly good chip control. At small turning widths of <¼ also the tips of the ridges 15 work as chipbreaking and chip-deviating protrusions. At longitudinal turning with small cutting depths, e.g., a cutting depth corresponding to <¼ of the cutting width, a longer portion of the outer side of the ridge 15 functions as a chipbreaker.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A cutting insert for chipforming cutting of metallic workpieces, comprising a rear shaft part and a cutting head situated at a front longitudinal end of the rear shaft part, the cutting head comprising:

a top side;

a bottom side;

a front relief surface extending between the top and bottom sides and forming a main cutting edge at its intersection with the top side;

lateral relief surfaces extending between the top and bottom sides, each lateral relief surface forming a side cutting edge at its intersection with the top side;

two laterally spaced, upstanding ridges disposed on the top side, each ridge extending generally in a longitudinal direction; and a chipbreaker pit formed in the top side between the two ridges, the pit comprising front and rear intersecting portions defining an intersection edge therebetween, the pit front portion intersecting the main cutting edge to form a depression therein, whereby the pit defines a guide for a rearwardly traveling chip;

upper portions of the ridges disposed in a vicinity of the intersection edge being rearwardly convergent and forming, together with the intersection edge, a squeezing zone for squeezing a rearwardly traveling chip;

the pit front portion including two laterally spaced burls situated in a proximity of respective ones of the ridges.

2. The cutting insert according to claim 1 wherein the two side cutting edges define a plane, the burls extending no higher than the plane.

3. The cutting insert according to claim 1 wherein the main cutting intersects the side cutting edges to form respective cutting corners therewith, front ends of the ridges flaring outwardly toward respective ones of the cutting corners.

4. The cutting insert according to claim 1 wherein a bottom of the pit front portion is lower than a bottom of the pit rear portion.

5. The cutting insert according to claim 1 wherein the side cutting edges define a plane, the ridges extending at least as high as the plane.

6. The cutting insert according to claim 5 wherein the ridges extend higher than the plane.

7. The cutting insert according to claim 1 wherein a minimum lateral dimension of the squeezing zone is less than a maximum lateral dimension of the depression formed in the main cutting edge.

8. The cutting insert according to claim 2 wherein a bottom of the pit front portion is lower than a bottom of the pit rear portion, the ridges extending at least as high as the plane, a minimum lateral dimension of the squeezing zone being less than a maximum lateral dimension of the depression formed in the main cutting edge.

9. The cutting insert according to claim 8 wherein the ridges extend higher than the plane.

10. The cutting insert according to claim 1 wherein the insert is a grooving insert.

* * * * *